WILLIAM R. BEUCHLER
RICHARD G. MARSHALL
INVENTORS

BY John R. Faulkner
Keith L. Zerschling
ATTORNEYS

United States Patent Office 3,328,757
Patented June 27, 1967

3,328,757
TURN SIGNAL INDICATOR PILOT LAMP SERVING AN ILLUMINATING FUNCTION
William R. Buechler, Birmingham, Mich., and Richard G. Marshall, Huntsville, Ala., assignors to The Ford Motor Company, Dearborn, Mich., a corporation of Delaware
Filed Nov. 19, 1964, Ser. No. 412,526
2 Claims. (Cl. 340—80)

This invention relates to a turn signal indication system for an automotive vehicle, and more particularly to such a system in which a pilot lamp that indicates to the vehicle operator the operation of the turn signals is also employed to steadily illuminate an indicating dial in the vehicle, preferably the transmission selector indicator dial.

The present invention provides a turn signal indicator system for an automotive vehicle in which the indicator or pilot lamp for indicating to the vehicle operator that the turn signals are operating is connected into the system so that it will provide illumination for a vehicle condition indicator in the automotive vehicle, preferably the transmission selector lever dial. This lamp will be energized continuously when the turn signal switch is in neutral position, but will be flashed to indicate turn signal operation when the turn signal switch is actuated.

In the invention, a turn signal lamp mounted on one side of the vehicle is coupled to a source of electrical energy through a flasher and a turn signal switch. When the turn signal switch is actuated, the turn signal lamp draws sufficient current to cause the flasher to operate and intermittently energize the turn signal lamp. A pilot or indicator lamp is also connected to the flasher independently of the turn signal switch, so that it will draw current from the source of electrical energy through the flasher when the turn signal switch is in either the actuated or unactuated positions. The current drawn by this pilot or indicator lamp, however, is small enough so that the flasher is not actuated when the turn signal switch is in the unactuated position.

The pilot or indicator lamp is preferably mounted to illuminate the transmission selector lever indicator dial in an automotive vehicle employing an automatic transmission. As such, it glows steadily as long as the ignition switch of the automotive vehicle is turned to the "on" position, and illuminates the indicator dial of the transmission selector lever to inform the vehicle operator of the exact position of the transmission shift lever. When the turn signal switch of the vehicle is actuated in either direction, this pilot lamp will flash, since it is energized through the flasher of the turn indicator system to indicate to the vehicle driver that he has signalled a turn.

An object of the invention is the provision of a turn signal indicating system in which the pilot or indicator lamp of the system also serves another illumination function in the vehicle.

A further object of the invention is the provision of an illuminating means for a vehicle condition indicator that also serves to indicate when the turn signal system of the vehicle has been actuated.

A further object of the invention is the combination into an economical and compact system of an illumination light for a transmission selector indicator dial with the pilot lamp used to indicate to the vehicle operator when the turn signal system of the vehicle has been actuated.

Other objects and attendant advantages of the present invention may be more readily realized when the specification is considered in connection with the attached drawings in which.

Figure 1:
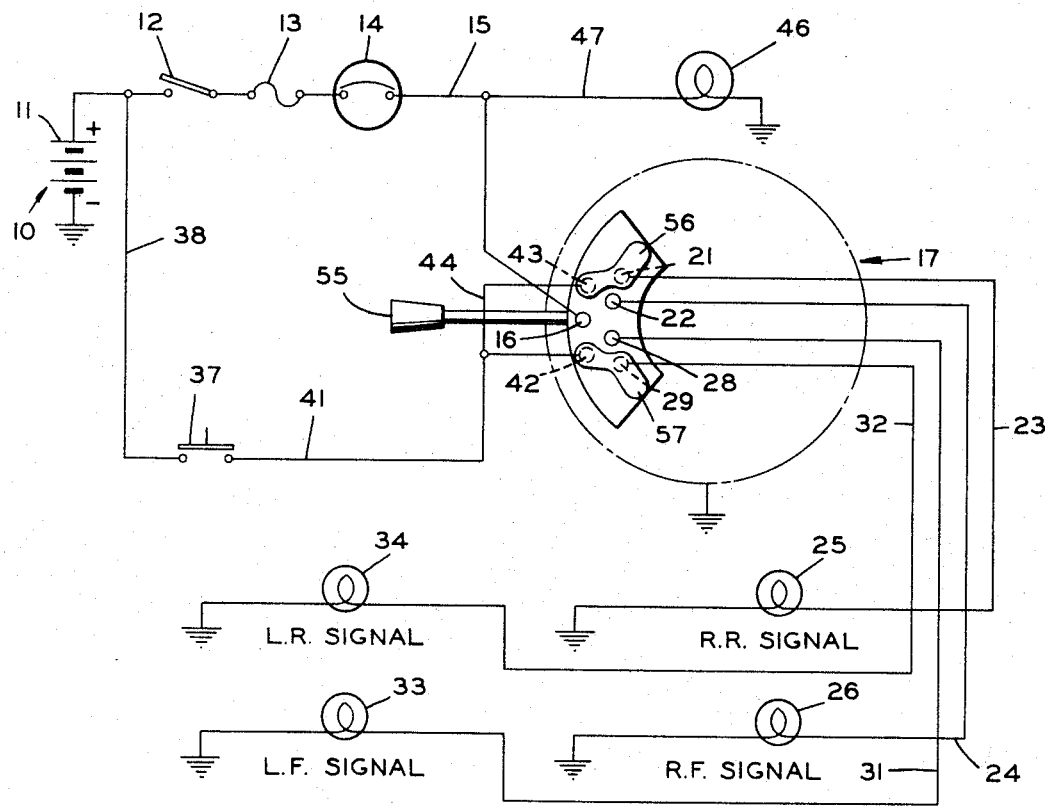
FIGURE 1 is a schematic diagram of the present invention.

Referring now to the drawings, there is shown in FIGURE 1 a circuit diagram of the invention in which a source of electrical energy 10 has one terminal 11 connected through ignition switch 12 and fuse 13 to one terminal of the standard flasher 14. This flasher 14 is of any standard type, and has contacts that intermittently open and close when the current through the flasher drawn by the circuit connected to the flasher reaches a predetermined level. The contacts will remain closed, however, if the current drawn by the circuit connected to the flasher is below this predetermined level. The other terminal of the flasher 14 is connected through lead 15 to a contact 16 of a standard turn signal switch 17. The turn signal switch 17 is represented schematically in FIGURE 1 and may be of any conventional type, for example, it may be the turn signal switch shown in U.S. Patent 3,076,067, issued Jan. 29, 1963, to P. J. Dryer et al.

The turn signal switch 17 in addition to having stationary contact 16 also has stationary contacts 21 and 22 connected through leads 23 and 24 respectively to the right rear turn signal lamp 25 and the right front turn signal lamp 26 that are located on the right-hand side of the exterior of an automotive vehicle. Additional stationary contacts 28 and 29 are connected through leads 31 and 32 respectively to the left front turn signal lamp 33 and the left rear turn signal lamp 34.

A stop lamp switch 37 that is operated by the depression of the vehicle brake pedal has one terminal connected through lead 38 to the positive terminal 11 of the battery 10, and the other terminal connected through lead 41 to a stationary contact 42 on the turn signal switch 17. The lead 41 and hence the stop lamp switch 37 is also connected to stationary contact 43 through a lead 44.

A pilot or indicator lamp 46 has one terminal connected to the lead 15 and hence to the flasher 14 through a lead 47 and has the other terminal connected to ground. This pilot lamp is used to illuminate a vehicle condition indicator in the interior of the automotive vehicle. Preferably, it is used to illuminate the indicator dial 48 of a transmission selector lever 51. The lamp 46 draws insufficient current in and of itself to cause the contacts of flasher 14 to open and close and as a result, the current drawn by the lamp 46 will be insufficient to open the flasher contacts 14. On the other hand, the current drawn by the right rear and the right front turn signals 25 and 26 or the left rear and the left front turn signals 33 and 34 will be sufficient to cause the flasher 14 to operate so that its contacts will intermittently open and close.

This turn signal switch 17 also includes a switch lever 55 coupled to movable contacts 56 and 57 that are adapted to couple the flasher 14 with the turn signal lamps 25, 26, 33 and 34 and to couple the stop lamp switch 37 with the rear turn signal lamps 26 and 33 as will be explained subsequently.

Figure 2:
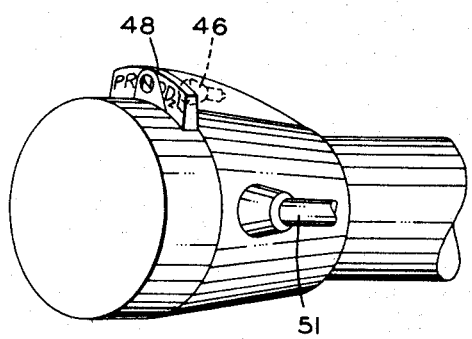
FIGURE 2 is a partial perspective view of a transmission selector mechanism and indicator dial.

In operation of the invention, with the ignition switch 12 closed and the turn signal switch 17 in the neutral position, the switch lever 55 and the movable contacts 56 and 57 will be in the position shown. The turn signal lamps 25, 26, 33 and 34 will not be energized at this time since neither of the movable contacts 56 and 57 is in engagement with the stationary contact 16 that is connected to flasher 14. The pilot or indicator lamp 46 will, however, be energized from the source of electrical energy 10 through the ignition switch 12, the flasher 14, the lead 15, and the lead 47, thus providing constant illumination of this lamp 46 since the current drawn by it is insufficient to intermittently open and close the contacts of flasher 14. This provides a constant illumination of the vehicle condition indicator that the lamp 46 illuminates, preferably the transmission selector indicator dial 48 as shown in FIGURE 2.

With the turn signal switch 17 in the neutral position as shown in FIGURE 1, a connection is provided to illuminate the right rear turn signal lamp 25 and the left rear turn signal lamp 34 from the source of electrical energy 10 through the stop lamp switch 37. This can be readily appreciated since a circuit is established to the left rear turn signal lamp 34 through the lead 41, stationary contact 42, movable contact 57, stationary contact 29 and lead 32. Connection is also established from the stop lamp switch 37 to the right rear turn signal lamp 25 through the lead 44, stationary contact 43, movable contact 56, stationary contact 21 and lead 23.

When the turn signal switch lever 55 is shifted downwardly, as shown in FIGURE 1, it moves the movable contact 56 downwardly so that the movable contact 56 is connected to the stationary contact 16 and stationary contacts 21 and 22, but is de-coupled from stationary contact 43. This will connect the source of electrical energy 10 through the flasher 14 to the right front turn signal lamp 26 and the right rear turn signal lamp 25 through these contacts and the leads 23 and 24. The uncovering of the stationary contact 43 by the movable contact 56 disables the stop light switch 37 from actuating the right rear turn signal lamp 25 when a right turn is being indicated. The current drawn by the turn signal lamps 25 and 26 through the flasher 14 is sufficient to cause its contacts to intermittently open and close thereby intermittently flashing the pilot lamp 46 as well as the turn signal lamps 25 and 26. When the turn signal switch 17 is again returned to the neutral position as shown in FIGURE 1, the pilot lamp 46 will again be energized continuously since the flasher 14 no longer draws sufficient current to cause its contacts to intermittently open and close.

It can be appreciated that during a left-hand turn, the operation of the invention is substantially the same as that described above in relation to a right-hand turn. When a left-hand turn is being completed or being signalled by the actuation of the turn signal switch lever 55, the movable contact 57 will connect the left-hand front and the left-hand rear turn signals 33 and 34 to the source of electrical energy 10 through the flasher 14 and the pilot or indicator lamp 46 will indicate that turn signal lamps 33 and 34 have been actuated by flashing in synchronism with these lamps.

The present invention thus provides a combination illumination and turn signal indication or pilot lamp that serves the dual function of illuminating a vehicle condition indicator on the interior of the vehicle and indicating to the vehicle operator when the turn signals have been actuated.

It is to be understood that this invention is not to be limited to the exact construction shown and described, but that various changes and modifications may be made without departing from the spirit and scope of the invention as defined in the appended claims.

We claim:
1. In an automotive vehicle:
a turn signal lamp drawing current above a predetermined level mounted on one side of said vehicle;
a source of electrical energy;
a flasher completing a circuit across contacts thereof when current below the predetermined level passes therethrough and intermittently opening and closing the contacts thereof when current above the predetermined level passes therethrough;
a turn signal switch movable from a neutral position to an actuated position to couple said source of electrical energy to said turn signal lamp through said contacts of said flasher; and
an indicator lamp drawing current below the predetermined level and connected to said source of electrical energy through said contacts of said flasher in parallel circuit arrangement with said turn signal lamp;
said indicator lamp being energized continuously from said source of electrical energy when said turn signal switch is in the neutral position and said flasher current is below the predetermined level and said indicator lamp being flashed intermittently when said turn signal switch is in the actuated position and said flasher current is above the predetermined level.

2. In an automotive vehicle:
an automatic transmission selector lever;
an indicator dial;
means coupled to said transmission selector lever and positioned adjacent said indicator dial for indicating the position of said transmission selector lever;
a turn signal lamp drawing current above a predetermined level mounted on one side of said vehicle;
a source of electrical energy;
a flasher completing a circuit across contacts thereof when current below the predetermined level passes therethrough and intermittently opening and closing the contacts thereof when current above the predetermined level passes therethrough;
a turn signal switch movable from a neutral position to an actuated position to couple said source of electrical energy to said turn signal lamp through said contacts of said flasher; and
an indicator lamp positioned to illuminate said indicator dial, said indicator lamp drawing current below the predetermined level and connected to said source of electrical energy through said contacts of said flasher in parallel circuit arrangement with said turn signal lamp;
said indicator lamp being energized continuously from said source of electrical energy when said turn signal switch is in the neutral position and said flasher current is below the predetermined level and said indicator lamp being flashed intermittently when said turn signal switch is in the actuated position and said flasher current is above the predetermined level.

References Cited

UNITED STATES PATENTS

| | | | |
|---|---|---|---|
| 1,704,949 | 3/1929 | Meisenheimer | 340—74 |
| 2,249,375 | 7/1941 | Day | 200—61.27 |
| 2,477,408 | 7/1949 | Gross | 340—81 X |
| 2,672,116 | 3/1954 | Gunderson | 116—124 |
| 3,037,188 | 5/1962 | Weigl | 340—81 X |
| 3,068,449 | 2/1962 | Aloway | 340—81 |

OTHER REFERENCES

Popular Mechanics, November 1933, p. 670.

NEIL C. READ, *Primary Examiner.*

I. J. LEVIN, *Assistant Examiner.*